Patented Apr. 11, 1933　　　　　　　　　　　　　　　　　　　　　　　　1,903,710

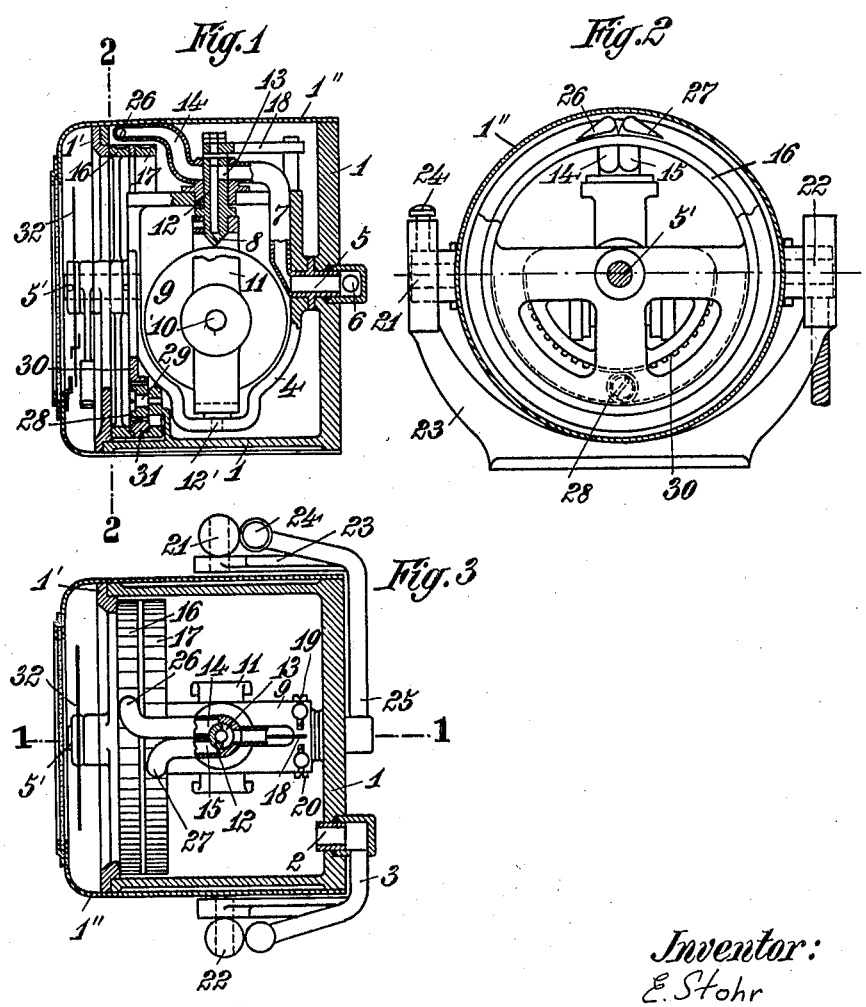

UNITED STATES PATENT OFFICE

ERICH STÖHR, OF BERLIN, GERMANY, ASSIGNOR TO THE FIRM GYRORECTOR G. M. B. H., OF BERLIN, GERMANY

GYROSCOPICALLY STABILIZED PENDULUM

Application filed November 29, 1927, Serial No. 236,576, and in Germany December 2, 1926.

This invention relates to a direction and curve indicator for moving bodies, such as aircraft and the like, which is constituted by a vertical indicator pendulum with a horizontal spindle, and by a gyroscope which is adapted to move with the horizontal axis of rotation about a vertical journal axis and in that way respond to disturbing torques about the axis of oscillation of the vertical indicator by precessional rotations about its journal axis. These precessions are utilized for supporting the pendulum of the vertical indicator. An indicator of this type is described in the United States Letters Patent No. 1,642,087, issued September 13th, 1927.

According to the invention the pendulum is held in true vertical position (for the purpose of reducing the weight and the air resistance of the apparatus to the greatest possible extent) by a repulsion device which exercises counter-torques.

A construction according to the invention is illustrated by way of example in the accompanying drawing:

Figure 1 is a section on the line 1—1 of Figure 3, partly in elevation.

Figure 2 is a section on the line 2—2 of Figure 1, and

Figure 3 a horizontal cross-section, partly in elevation.

The bracket 23 supporting the instrument may be a rigid part of the vehicle. An airtight casing is mounted on the said bracket and is rotatable about horizontal pins 21, 22 which are parallel to the transverse axis of the vehicle. This casing is constituted by a box 1 with a front wall 1' and with a cap 1'' secured thereto. In the casing is provided a nozzle 2 which leads to a pipe 3, and by means of which, during travel, the air is exhausted from the casing. A vertical indicator pendulum or support 4 is mounted in the casing and is rotatable about horizontal pins 5, 5', the latter pin 5' carrying the scale 32, which serves to indicate the true vertical direction. The spindle 5 is hollow, and is in communication through an opening 6 with a pipe 25 for the supply of air, and with a conduit 7 provided in the pendulum. This conduit is situated opposite the port 13 of a hollow rotary valve 12 which extends downwards and ends in a nozzle 8. Opposite the said nozzle is arranged the gyroscope 9, the horizontal axis of rotation 10 of which is arranged transversely and is supported by a frame 11. This frame is rigidly secured to the rotary valve 12 which, together with a pin 12' mounted in the pendulum 4, constitutes the vertical axis of rotation for the gyroscope frame.

The air admitted through 25, passes through 7, 13, 12 and the nozzle 8 and impinges against the gyroscope 9 which is thus caused to rotate. It may move precessionally with its inner frame 11 about the pins 12, 12' at right angles to the two pins 5, 5' and 10. During such movements, it effects connection by means of the port 13, either with a pipe 14 or with a pipe 15, so that the air escapes on the hollow valve 12 from the pendulum either into one pipe or the other and by its reaction gives a correcting torque.

The pipes 14, 15 terminate in nozzles 26, 27 which are situated opposite circular sets of blades or scoops 16, 17, loosely rotatable on the pin 5' and provided with oppositely directed blades. These blades are secured to a toothed rim 31 with which meshes a gear-wheel 28 which is mounted on a pin 29 horizontally mounted in the casing 1. With the said pinion meshes a toothed quadrant 30 which is rigidly secured to the pendulum 4. Owing to the arrangement of the sets of blades 16, 17, the reaction is increased, their resistance being utilized for the supporting action.

The deflection of the gyroscope and frame 11 is limited by means of a spring 18 mounted on the rotary valve 12 and arranged between set screws 19 and 20. In the pipe 25 is provided a press button 24 by means of which the driver may shut off the supply of air and thus disconnect the supporting device, that is to say bring about a quick return of the pendulum to the original position after any disturbances.

When the said pendulum frame 4 is deflected under disturbing forces of acceleration about the axes 5, 5', the gyroscope 9 will move precessionally with its frame 11 about the axis 12, 12' and thereby open the air outlet 14 or 15 through one of the nozzles 26 or 27, which ejects the current of air to its blade or scoop 16 or 17. Either one or the other air current is opened according to the direction of the disturbance and exerts by the reaction a correcting torque on the pendulum frame 4.

If the frame 11 of the gyroscope has rotated to a certain extent, the elastic impact of the spring 18 against one of the screws (19, 20) prevents an excessive deviation of the gyroscope 9 from its normal position.

When the aviator operates the push-button, the current of air passing out of the nozzles 26, 27 will be interrupted and the pendulum frame 4, which is then no longer subjected to the supporting torque, can swing into its position of rest like an ordinary pendulum.

Any desired liquid or gas may be used, for instance, compressed air from a pump operated by the vehicle propelling machinery or by an auxiliary engine, or from a suction nozzle operated by speed of the shaft.

Having now particularly described and ascertained the nature of my said invention and in what manner the same is to be performed, I declare that what I claim is:

1. In a direction and curve indicator for a moving body, a gyroscope, a support constituting a pendulum and rotatable about a horizontal axis in the body, a frame for supporting the gyroscope for spinning said frame and gyroscope being rotatable about a vertical axis on the support, the respective axes of rotation being disposed at right angles to each other, a pneumatic impulse device, means connecting the impulse device and support for resisting rotation of the support, means for conducting fluid under pressure to the impulse device, and means operated by the precession of the gyroscope and frame, and mounted directly on the indicator pendulum for controlling the flow of fluid to the impulse device.

2. In a direction and curve indicator having a moving body, a gyroscope, a support constituting a pendulum and rotatable about a horizontal axis on the body, a frame for supporting the gyroscope for spinning said frame and gyroscope and being rotatable about a vertical axis in the support, the respective axes of rotation being disposed at right angles to each other, a pneumatic impulse device, means connecting the impulse device and support for resisting rotation of the support, means for conducting fluid under pressure to the impulse device, valve means for controlling said fluid, said valve being controlled by the precessional movement of the gyroscope and frame to apply a torque to the support, said device including air jets on the support, and conduits communicating with the fluid supply for supplying fluid under pressure to the jets.

3. In a direction and curve indicator for a moving body, a gyroscope, a support constituting a pendulum and rotatable about a horizontal axis in said body, a frame for supporting the gyroscope for spinning said frame and gyroscope being rotatable about a vertical axis in said support, the respective axes of rotation being disposed at right angles to each other, a pneumatic impulse device including an air jet and an impulse wheel, means for supplying fluid under pressure to the impulse device, a valve controlling the flow of air from said jet, said valve being controlled by precession of said gyroscope and frame, means connecting the impulse wheel and support to apply a torque to the support by the impact of the jet upon the wheel upon precession of the gyroscope for imparting a torque on the support to keep the pendulum in normal position during acceleration pressures thereon.

In testimony whereof I affix my signature.

ERICH STOHR.